US012769301B2

(12) United States Patent
Shao et al.

(10) Patent No.: US 12,769,301 B2
(45) Date of Patent: Oct. 20, 2026

(54) METHODS AND INTERNET OF THINGS (IoT) SYSTEMS FOR MAINTAINING SMART GAS FILLING STATION BASED ON SAFETY SUPERVISION

(71) Applicant: CHENGDU QINCHUAN IOT TECHNOLOGY CO., LTD., Chengdu (CN)

(72) Inventors: Zehua Shao, Chengdu (CN); Yong Li, Chengdu (CN); Junyan Zhou, Chengdu (CN)

(73) Assignee: CHENGDU QINCHUAN IOT TECHNOLOGY CO., LTD., Chengdu (CN)

(*) Notice: Subject to any disclaimer, the term of this patent is extended or adjusted under 35 U.S.C. 154(b) by 23 days.

(21) Appl. No.: 18/983,227

(22) Filed: Dec. 16, 2024

(65) Prior Publication Data

US 2025/0117004 A1 Apr. 10, 2025

(30) Foreign Application Priority Data

Nov. 21, 2024 (CN) ........................ 202411676337.4

(51) Int. Cl.
*G05B 23/02* (2006.01)
*G06Q 10/0631* (2023.01)
(Continued)

(52) U.S. Cl.
CPC ....... *G05B 23/0283* (2013.01); *G05B 23/024* (2013.01); *G05B 23/0281* (2013.01);
(Continued)

(58) Field of Classification Search
CPC .............. G05B 23/0283; G05B 23/024; G05B 23/0281; G06Q 10/06315; G06Q 10/20;
(Continued)

(56) References Cited

U.S. PATENT DOCUMENTS

2011/0196593 A1* 8/2011 Jiang .................. G05B 23/0283 701/100
2020/0249649 A1* 8/2020 Zhu ...................... G05B 19/408
(Continued)

FOREIGN PATENT DOCUMENTS

CA 2692218 A1 * 1/2009 ............. G01N 9/266
CN 1583480 A * 2/2005 ................ B60P 3/00
(Continued)

OTHER PUBLICATIONS

Guo, Zhengxi, Shanghai Intelligent Public Transport System Based on Internet of Things, Computer Applications and Software, 34(8): 130-135, 2017.

*Primary Examiner* — Lal Ce Mang
(74) *Attorney, Agent, or Firm* — METIS IP LLC

(57) ABSTRACT

Disclosed is a method and an IoT system for maintaining a smart gas filling station based on safety supervision. The method comprises: obtaining historical gas filling data; determining, based on the historical gas filling data, a predicted usage feature; obtaining historical operation data; determining a historical operation feature based on the historical operation data; determining an operation and maintenance parameter based on the predicted usage feature and the historical operation feature, and generating a maintenance instruction; obtaining a count of reference vehicles; and generating a regulation instruction in response to determining that the count of the reference vehicles is greater than a reference threshold. The IoT system comprises a government safety supervision service platform, a government safety supervision management platform, a government safety supervision sensor network platform, a government safety supervision object platform, a gas company sensor network platform, and a gas equipment object platform.

15 Claims, 4 Drawing Sheets

(51) Int. Cl.

| | |
|---|---|
| ***G06Q 10/20*** | (2023.01) |
| ***G06Q 50/06*** | (2012.01) |
| ***G06Q 50/26*** | (2012.01) |
| ***G16Y 10/35*** | (2020.01) |
| ***G16Y 20/30*** | (2020.01) |
| ***G16Y 40/10*** | (2020.01) |
| ***G16Y 40/50*** | (2020.01) |

(52) U.S. Cl.

CPC ....... *G06Q 10/06315* (2013.01); *G06Q 10/20* (2013.01); *G06Q 50/06* (2013.01); *G06Q 50/265* (2013.01); *G16Y 10/35* (2020.01); *G16Y 20/30* (2020.01); *G16Y 40/10* (2020.01); *G16Y 40/50* (2020.01)

(58) Field of Classification Search

CPC ...... G06Q 50/06; G06Q 50/265; G16Y 10/35; G16Y 20/30; G16Y 40/10; G16Y 40/50; H04L 67/12; G08G 1/0125; G08G 1/0145

See application file for complete search history.

(56) References Cited

U.S. PATENT DOCUMENTS

| | | | | |
|---|---|---|---|---|
| 2022/0108262 | A1* | 4/2022 | Cella | G05B 17/02 |
| 2024/0190091 | A1* | 6/2024 | Zhu | F16L 1/26 |

FOREIGN PATENT DOCUMENTS

| | | | | | |
|---|---|---|---|---|---|
| CN | 109559183 | A | * | 4/2019 | G06Q 30/0201 |
| CN | 114096085 | A | * | 2/2022 | H05K 7/20145 |
| CN | 115789524 | A | * | 3/2023 | Y02P 90/02 |
| CN | 115988028 | A | * | 4/2023 | H04L 67/12 |
| CN | 115949891 | B | * | 5/2023 | F17D 5/06 |
| CN | 116090719 | A | * | 5/2023 | G06Q 10/06311 |
| CN | 116205610 | A | * | 6/2023 | G06Q 10/103 |
| CN | 115713715 | B | * | 10/2023 | Y02P 90/30 |
| CN | 117808532 | A | * | 4/2024 | G06Q 50/02 |
| CN | 117875720 | A | | 4/2024 | |
| CN | 118012848 | A | | 5/2024 | |
| CN | 118536759 | A | | 8/2024 | |
| JP | 2005199223 | A | * | 7/2005 | B01D 53/44 |

* cited by examiner

METHODS AND INTERNET OF THINGS (IoT) SYSTEMS FOR MAINTAINING SMART GAS FILLING STATION BASED ON SAFETY SUPERVISION

CROSS-REFERENCE TO RELATED APPLICATIONS

This application claims priority to Chinese Application No. 202411676337.4, filed on Nov. 21, 2024, the entire contents of which are incorporated herein by reference.

TECHNICAL FIELD

The present disclosure relates to the field of gas management, and in particular to a method and an Internet of Things (IoT) system for maintaining a smart gas filling station based on safety supervision.

BACKGROUND

In addition to repair in case of failure, the gas filling device of the gas filling station further requires routine maintenance to reduce the risk. It is therefore extremely important to determine the means of routine maintenance for different gas filling devices and auxiliary operation devices of the gas filling station for minimizing the impact on the daily operation of the gas filling station while reducing the risk.

Traditional maintenance often relies on manual experience and fixed maintenance schedules, and lacks intelligent prediction of future usage and equipment status of the gas filling devices, as well as lacks the ability to dynamically adjust maintenance strategies based on real-time data.

Therefore, it is desirable to provide a method and an Internet of Things (IoT) system for maintaining a smart gas filling station based on safety supervision to realize reasonable maintenance of the gas filling devices, so as to guarantee stable operation of the gas filling devices while reducing the impact of the maintenance on the daily operation of the gas filling station.

SUMMARY

One or more embodiments of the present disclosure provide a method for maintaining a smart gas filling station based on safety supervision, implemented by an Internet of Things (IoT) system for maintaining a smart gas filling station. The IoT system may include a government safety supervision service platform, a government safety supervision management platform, a government safety supervision sensor network platform, a government safety supervision object platform, a gas company sensor network platform, and a gas equipment object platform. The government safety supervision object platform may include a gas company management platform. The method may comprise: in response to determining that a current moment is a preset moment for updating a maintenance parameter and a residual computational resource of the IoT system is greater than a computational threshold at the current moment: obtaining, through the gas equipment object platform, historical gas filling data of the gas filling station in a preset time period; determining, based on the historical gas filling data, a predicted usage feature of the gas filling station in a future time period; obtaining, through the gas equipment object platform, historical operation data of a plurality of gas filling devices of the gas filling station in the preset time period, the historical operation data of the plurality of gas filling devices being collected at first preset frequencies, and the first preset frequencies of different gas filling devices being different; determining a historical operation feature of each of the plurality of gas filling devices based on the historical operation data of the plurality of gas filling devices; determining an operation and maintenance parameter of each of the plurality of gas filling devices based on the predicted usage feature of the gas filling station and the historical operation feature of each of the plurality of gas filling devices, and generating a maintenance instruction to be sent to the gas company management platform, the operation and maintenance parameter including an operation and maintenance frequency, an operation and maintenance time period, and an operation and maintenance item; for each of the plurality of gas filling devices, determining a time distance based on the operation and maintenance frequency of the gas filling device, the time distance being a time difference between the current moment and a next maintenance time period of the gas filling device, and adjusting the first preset frequency corresponding to the gas filling device based on the time distance; obtaining, through the government safety supervision service platform, a count of reference vehicles at a second preset frequency, the reference vehicles being vehicles that are in motion and are destined for the gas filling station; and generating a regulation instruction in response to determining that the count of the reference vehicles is greater than a reference threshold, and sending the regulation instruction to the reference vehicles through the government safety supervision service platform, the regulation instruction including determining one or more candidate gas filling stations, and the one or more candidate gas filling stations being other gas filling stations within a preset range of the gas filling station.

One or more embodiments of the present disclosure provide an Internet of Things (IoT) system for maintaining a smart gas filling station based on safety supervision. The IoT system may comprise a government safety supervision service platform, a government safety supervision management platform, a government safety supervision sensor network platform, a government safety supervision object platform, a gas company sensor network platform, and a gas equipment object platform. The government safety supervision object platform may include a gas company management platform. The IoT system may be configured to: in response to determining that a current moment is a preset moment for updating a maintenance parameter and a residual computational resource of the IoT system is greater than a computational threshold at the current moment: obtain, through the gas equipment object platform, historical gas filling data of the gas filling station in a preset time period; determine, based on the historical gas filling data, a predicted usage feature of the gas filling station in a future time period; obtain, through the gas equipment object platform, historical operation data of a plurality of gas filling devices of the gas filling station in the preset time period, the historical operation data of the plurality of gas filling devices being collected at first preset frequencies, and the first preset frequencies of different gas filling devices being different; determine a historical operation feature of each of the plurality of gas filling devices based on the historical operation data of the plurality of gas filling devices; determine an operation and maintenance parameter of each of the plurality of gas filling devices based on the predicted usage feature of the gas filling station and the historical operation feature of each of the plurality of gas filling devices, and generate a maintenance instruction to be sent to the gas company management platform, the operation and maintenance parameter including an operation and maintenance frequency, an operation and maintenance time period, and an operation and maintenance item; for each of the plurality of gas filling devices, determine a time distance based on the operation and maintenance frequency of the gas filling device, the time distance being a time difference between the current moment and a next maintenance time period of the gas filling device, and adjust the first preset frequency corresponding to the gas filling device based on the time distance; obtain, through the government safety supervision service platform, a count of reference vehicles at a second preset frequency, the reference vehicles being vehicles that are in motion and are destined for the gas filling station; and generate a regulation instruction in response to determining that the count of the reference vehicles is greater than a reference threshold, and send the regulation instruction to the reference vehicles through the government safety supervision service platform, the regulation instruction including determining one or more candidate gas filling stations, and the one or more candidate gas filling stations being other gas filling stations within a preset range of the gas filling station.

One or more embodiments of the present disclosure provide a non-transitory computer-readable storage medium comprising computer instructions that, when read by a computer, may direct the computer to perform the method for maintaining the smart gas filling station based on safety supervision.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, wherein.

DETAILED DESCRIPTION

Figure 1:
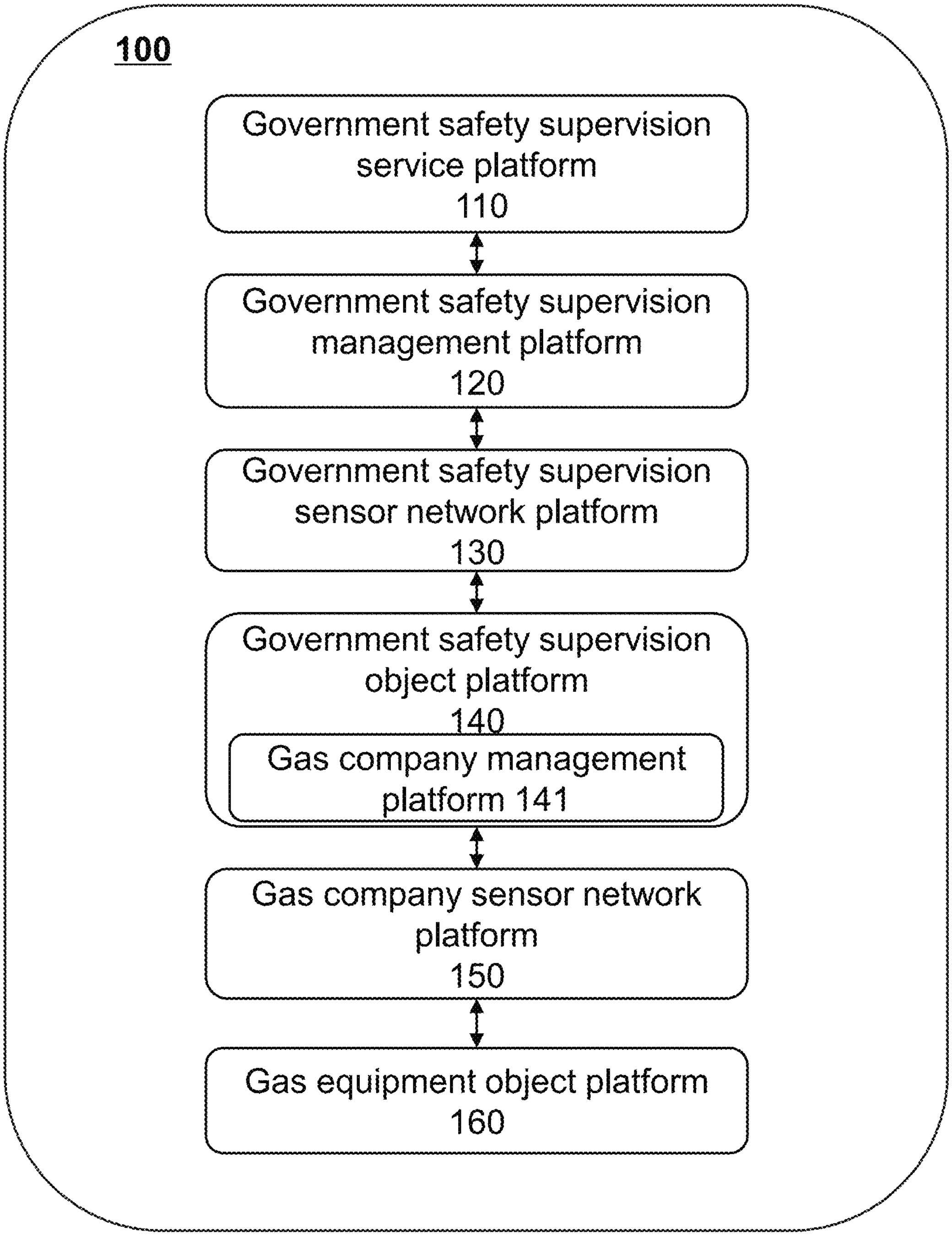
FIG. 1 is a schematic structural diagram illustrating an Internet of Things (IoT) system for maintaining a smart gas filling station based on safety supervision according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

As shown in the present disclosure and in the claims, unless the context clearly suggests an exception, the words "one," "a," "an," "one kind," and/or "the" do not refer specifically to the singular, but may also include the plural. Generally, the terms "including" and "comprising" suggest only the inclusion of clearly identified steps and elements, however, the steps and elements that do not constitute an exclusive list, and the method or apparatus may also include other steps or elements.

Flowcharts are used in the present disclosure to illustrate the operations performed by a system according to embodiments of the present disclosure, and the related descriptions are provided to aid in a better understanding of the magnetic resonance imaging method and/or system. It should be appreciated that the preceding or following operations are not necessarily performed in an exact sequence. Instead, steps can be processed in reverse order or simultaneously. Also, it is possible to add other operations to these processes or to remove a step or steps from these processes.

FIG. 1 is a schematic structural diagram illustrating an Internet of Things (IoT) system for maintaining a smart gas filling station based on safety supervision according to some embodiments of the present disclosure.

In some embodiments, as shown in FIG. 1, the IoT system for maintaining the smart gas filling station based on safety supervision 100 based on safety supervision (hereinafter referred to as the "IoT system 100") may include a government safety supervision service platform 110, a government safety supervision management platform 120, a government safety supervision sensor network platform 130, a government safety supervision object platform 140, a gas company sensor network platform 150, and a gas equipment object platform 160. The government safety supervision object platform 140 may include a gas company management platform 141.

The government safety supervision service platform 110 is a platform that provides gas supervision services to users.

The government safety supervision management platform 120 is a comprehensive management platform for government management information.

In some embodiments, the government safety supervision management platform 120 may interact with the government safety supervision service platform 110 and the government safety supervision sensor network platform 130.

The government safety supervision sensor network platform 130 is a platform used for comprehensive management of government sensor information, such as a communication base station, a router, a wireless WIF device, or the like. In some embodiments, the government safety supervision sensor network platform 130 may interact with the government safety supervision management platform 120 and the government safety supervision object platform 140.

The government safety supervision object platform 140 is a platform for generation of government supervision information and control of information execution. In some embodiments, the government safety supervision object platform 140 may include the gas company management platform 141. The gas company management platform 141 refers to a platform that performs information management for gas companies.

In some embodiments, the government safety supervision object platform 140 may interface with the government safety supervision sensor network platform 130 and the gas company sensor network platform 150.

The gas company sensor network platform 150 refers to a platform for comprehensive management of sensor information for the gas companies. In some embodiments, the gas company sensor network platform 150 may include a communication base station, a router, a wireless WIF device, or the like. In some embodiments, the gas company sensor network platform 150 may interface with the government safety supervision object platform 140 and the gas equipment object platform 160.

In some embodiments, the gas equipment object platform 160 may be configured as a monitoring device and/or a pipeline network device to obtain operation data of a plurality of gas filling devices of a gas filling station. For example, the gas equipment object platform 160 may include a camera device, a positioning device, a gas compressor, a gas pipeline, a flow meter, a manometer, or the like.

In some embodiments, the gas equipment object platform 160 may interface with the government safety supervision object platform 140 through the gas company sensor network platform 150.

Figure 2:
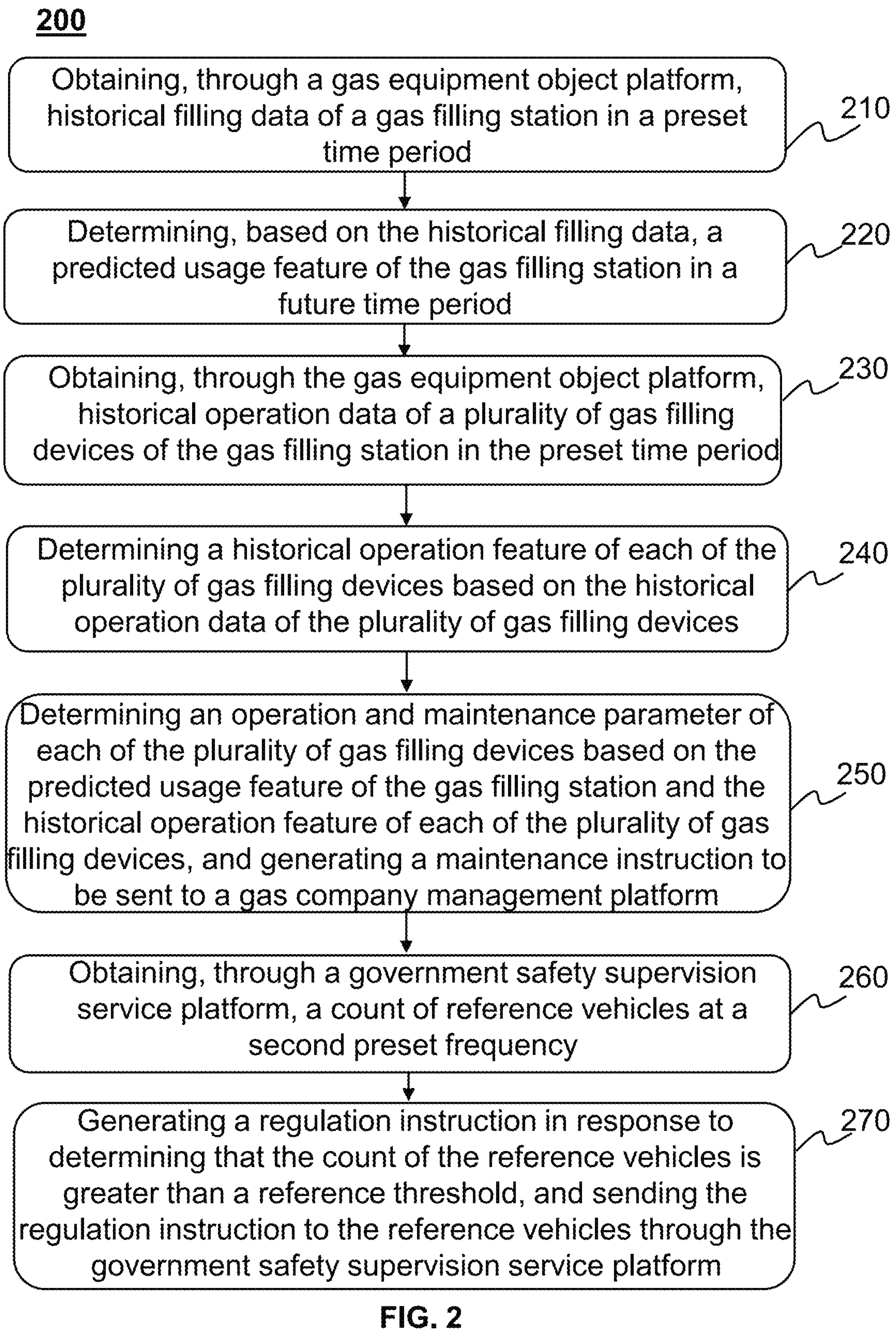
FIG. 2 is a flowchart illustrating an exemplary method for maintaining a smart gas filling station based on safety supervision according to some embodiments of the present disclosure.
Figure 3:
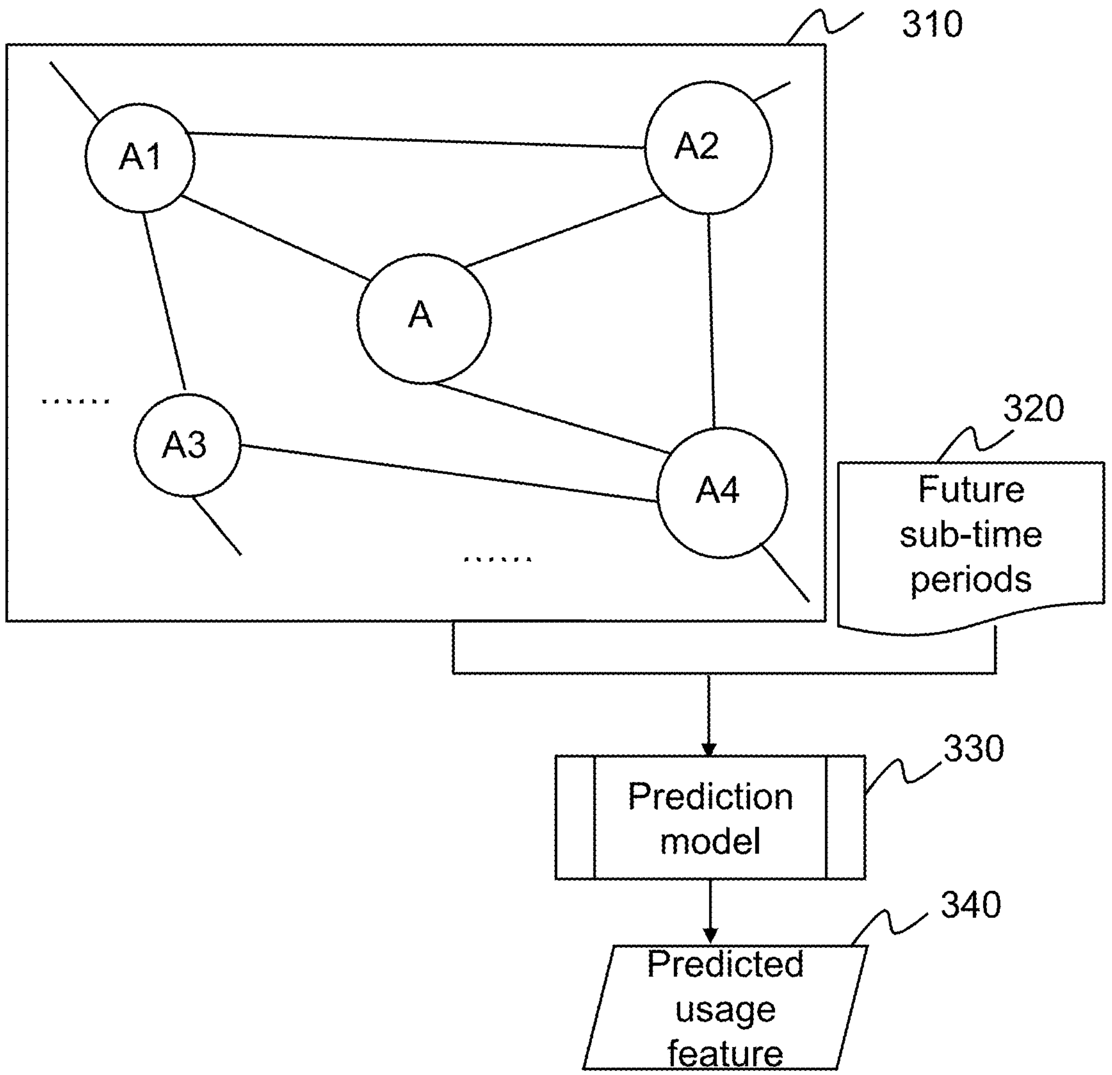
FIG. 3 is a schematic diagram illustrating an exemplary prediction model according to some embodiments of the present disclosure.
Figure 4:
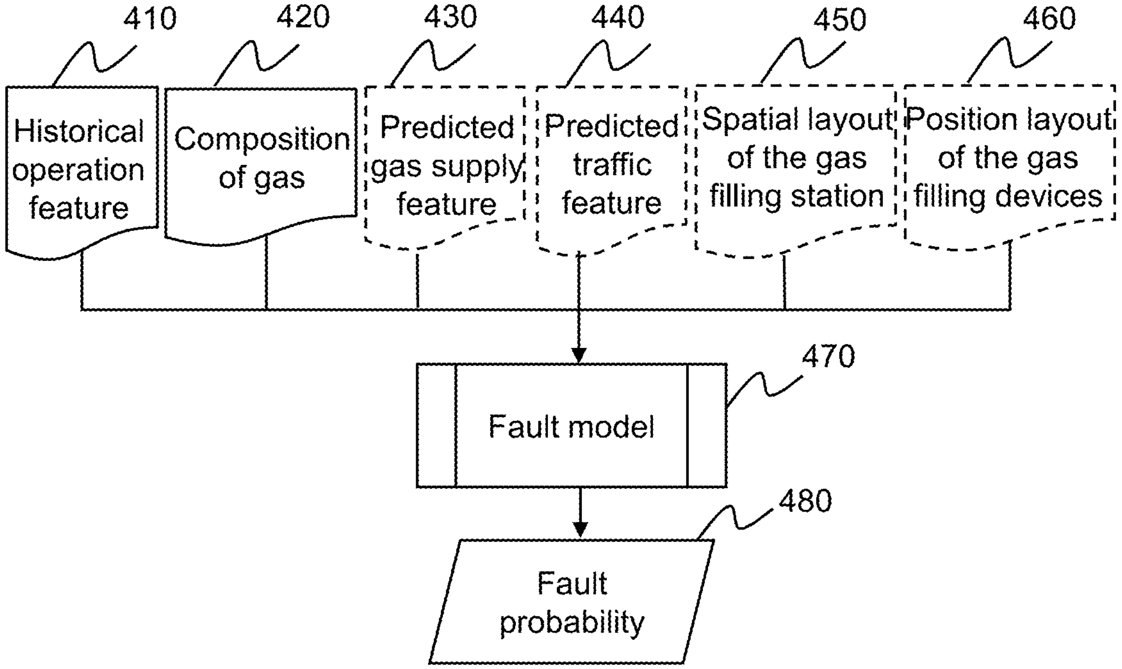
FIG. 4 is a schematic diagram illustrating an exemplary fault model according to some embodiments of the present disclosure.

More descriptions regarding the functionality of the IoT system 100 may be found elsewhere in the present disclosure (e.g., FIGS. 2-4 and related descriptions thereof).

In some embodiments of the present disclosure, various functional platforms are coordinated and regularly operated with each other to form a closed loop of information operation based on the IoT system for maintaining the smart gas filling station, so as to realize informatization and intelligence of the real-time detection and routine maintenance of the gas filling devices of the gas filling station.

FIG. 2 is a flowchart illustrating an exemplary method for maintaining a smart gas filling station based on safety supervision according to some embodiments of the present disclosure.

In some embodiments, in response to determining that a current moment is a preset moment for updating a maintenance parameter, and a residual computational resource of the IoT system at the current moment is greater than a computational threshold, the government safety supervision management platform 120 may perform a process 200 as shown in FIG. 2.

In some embodiments, the government safety supervision management platform 120 may determine a plurality of preset moments based on a preset update frequency. The preset update frequency may be preset based on experience. For example, if the preset update frequency is 4 times/day, the preset moments may be set to 0:00, 6:00, 12:00, and 18:00 daily.

In some embodiments, if the computational resource of the IoT system has a surplus, i.e., if the residual computational resource of the IoT system at the current moment is greater than the computational threshold, the government safety monitoring management platform 120 may perform the method for maintaining the smart gas filling station as shown in the process 200, so as to reduce the risk of failure of the gas filling station without affecting the daily operation of the gas filling station. The computational threshold may be preset based on experience.

As shown in FIG. 2, the process 200 may include the following operations. In some embodiments, the process 200 may be performed by the government safety supervision management platform 120.

In 210, historical gas filling data of a gas filling station in a preset time period may be obtained through a gas equipment object platform. The preset time period may be a period of time within a historical time period.

Gas filling data is data related to gas filling. For example, the gas filling data may include a target vehicle, a gas filling time of the target vehicle, and a gas filling volume. The target vehicle is a vehicle that performs gas filling at the gas filling station. The historical gas filling data refers to gas filling data in the preset time period. In some embodiments, the historical gas filling data may be obtained from the gas equipment object platform 160.

In 220, a predicted usage feature of the gas filling station in a future time period may be determined based on the historical gas filling data.

The predicted usage feature is an extent to which the gas filling station is used in future time period. In some embodiments, the predicted usage feature reflects the extent to which the gas filling station provides gas in the future time period. In some embodiments, the predicted usage feature reflects a gas supply pressure of the gas filling station in the future time period. In some embodiments, the predicted usage feature may include a predicted gas supply feature. The predicted gas supply feature refers to a a total volume of gas filling provided by the gas filling station in the future time period.

In some embodiments, the government safety supervision management platform 120 may intercept a historical time period that is equal in duration to the future time period, obtain a total volume of gas filling provided by the gas filling station in the historical gas filling data of the historical time period to determine as the predicted gas supply feature, and use the predicted gas supply feature as the predicted usage feature. More descriptions regarding determining the predicted usage feature may be found elsewhere in the present disclosure (e.g., FIG. 3 and related descriptions thereof)

In 230, historical operation data of a plurality of gas filling devices of the gas filling station in the preset time period may be obtained through the gas equipment object platform.

The gas filling device refers to a related device used for a gas filling operation, such as a gas storage device, a gas dispenser, a submerged liquefied natural gas (LNG) pump, a gas filling column, a gas relief column, a discharge pipe, etc.

The historical operation data refers to data related to historical operation of the gas filling devices, such as use frequencies of the gas filling devices, an operation parameter sequence, etc. In some embodiments, the historical operation data reflects wear and tear on the gas filling devices after a plurality of historical uses, and also reflects fault probabilities of the gas filling devices in the future time period.

The operation parameter sequence is a sequence consisting of data on operation parameters of the gas filling devices. In some embodiments, there is differences in types of the operation parameters to be regulated and collected by different gas filling devices, and the types of the operation parameters to be regulated and captured may be preset. Data corresponding to a set of operation parameters of a preset type of a certain gas filling device may be collected at a certain moment. A plurality sets of data of a certain gas filling device may be collected at a plurality of moments to constitute the operation parameter sequence.

The types of the operation parameters of different gas filling devices are described below by way of examples.

For example, for the gas storage device, types of operation parameters may include temperature, pressure, audio data, an on condition, a current moment, or the like. As another example, for the gas dispenser, types of operation parameters may include temperature, pressure, audio data, an on condition, a current moment, a gas filling speed, or the like. As another example, for the submerged LNG pump, types of operation parameters may include temperature, pressure, audio data, an on condition, a current moment, vibration data, or the like. As another example, for the gas filling column, the gas relief column, and the discharge pipe, types of operation parameters may include temperature, audio data, an on condition, a current moment, or the like.

The temperature, the pressure, the gas filling speed, and the vibration data may obtained through a temperature sensor, a pressure sensor, a speed sensor, and a vibration sensor respectively disposed on the corresponding gas filling devices, and the audio data may obtained through an audio device disposed the corresponding gas filling device.

In some embodiments, the historical operation data of the plurality of gas filling devices may be collected at first preset frequencies. The first preset frequencies of the different gas filling devices may be different. The first preset frequencies may be determined based on preset. For example, an initial first preset frequency may be set to to.

In some embodiments, the first preset frequencies may be adjusted based on a historical count of repairs of the gas filling devices. For example, the higher the historical count of repairs of the gas filling devices, the higher the first preset frequencies are adjusted based on the initial first preset frequency. In some embodiments, the first preset frequencies may be adjusted based on a time distance. For example, the shorter the time distance, the higher the first preset frequencies are adjusted based on the initial first preset frequency. More descriptions regarding the time distance may be found in the present disclosure below.

In 240, a historical operation feature of each of the plurality of gas filling devices may be determined based on the historical operation data of the plurality of gas filling devices.

The historical operation feature reflects a historical usage of each of the gas filling devices. In some embodiments, the historical operation features of different gas filling devices may be different. For example, for the gas storage device, the historical operation feature may include a temperature change sequence, a pressure change sequence, an audio data anomaly degree, etc.

In some embodiments, the government safety supervision management platform 120 may determine the historical operation feature of each of the gas filling devices based on the historical operation data of the plurality of gas filling devices in various ways such as statistical analysis. For example, the government safety supervision management platform 120 may obtain temperatures collected at a plurality of moments in the historical operation data, calculate a temperature change rate at each two adjacent moments, and form temperature change sequence from the plurality of temperature change rates. The pressure change sequence may be determined in a similar manner as the temperature change sequence.

As another example, the government safety supervision management platform 120 may take audio data in the historical operation data collected at the preset time period, calculate a similarity of the audio data with standard audio data in an audio database one by one, and take audio data of which the similarity is lower than a similarity threshold as suspicious audio data, and the government safety supervision management platform 120 may calculate a proportion of the suspicious audio data to total audio data collected during the preset time period and use the proportion as the audio data anomaly degree. The audio database is a database that is preset to store a large amount of standard audio data. The similarity threshold may be preset and determined based on experience.

In 250, an operation and maintenance parameter of each of the plurality of gas filling devices may be determined based on the predicted usage feature of the gas filling station and the historical operation feature of each of the plurality of gas filling devices, and a maintenance instruction may be generated to be sent to a gas company management platform.

The operation and maintenance parameter refers to data related to operation and maintenance of each of the gas filling devices. In some embodiments, the operation and maintenance parameter may include an operation and maintenance frequency, an operation and maintenance time period, and an operation and maintenance item. The operation and maintenance frequency refers to a frequency of performing the operation and maintenance. The operation and maintenance time period refers to a time period of performing the operation and maintenance. The operation and maintenance item may include an operation item that is required to be performed for repair.

In some embodiments, the government safety supervision management platform 120 may determine the operation and maintenance parameter based on vector matching. The government safety supervision management platform 120 may construct a first vector database. The first vector database may include a plurality of first reference vectors and reference operation and maintenance parameters corresponding to the plurality of first reference vectors. Each of the first reference vectors may be constructed based on a historical predicted usage feature of the gas filling station and the historical operation feature of each of the gas filling device. Each of the reference operation and maintenance parameters may be constructed based on a historical operation and maintenance parameter corresponding to each of the first reference vectors. The historical operation and maintenance parameter may be an operation and maintenance parameter of the gas filling station during normal operation.

The government safety supervision management platform 120 may construct a target feature vector based on the predicted usage feature of the current gas filling station and the historical operation feature of each of the gas filling devices. The government safety supervision management platform 120 may match, based on the target feature vector, in the first vector database, to obtain a first reference vector with the smallest vector distance, and determine a historical operation and maintenance parameter corresponding to this first reference vector as the operation and maintenance parameter.

In some embodiments, for each of the plurality of gas filling devices, the government safety supervision management platform 120 may determine a time distance based on the operation and maintenance frequency of the gas filling device, the time distance being a time difference between the current moment and a next maintenance time period of the gas filling device. The government safety supervision management platform 120 may adjust the first preset frequency corresponding to the gas filling device based on the time distance. For example, the smaller the time distance, the higher the first preset frequency. That is, the closer the current moment is to the maintenance time period, the higher the first preset frequency, which helps the maintenance personnel to grasp the data of the gas filling device at the latest moment, and facilitates the maintenance.

The maintenance instruction is an instruction to mobilize the maintenance personnel to the gas filling station to perform maintenance. For example, the maintenance instruction may include a maintenance time period, a maintenance item, or the like. In some embodiments, the government safety supervision management platform 120 may generate the maintenance instructions based on the operation and maintenance parameter. For example, the government safety supervision management platform 120 may determine the maintenance time period in the maintenance instruction based on the operation and maintenance frequency and the operation and maintenance time period, and determine the operation and maintenance item as the maintenance item in the maintenance instruction.

More descriptions regarding determining the operation and maintenance parameter may be found elsewhere in the present disclosure (e.g., FIG. 3 and related descriptions thereof).

In 260, a count of reference vehicles may be obtained at a second preset frequency through a government safety supervision service platform.

The reference vehicles are vehicles that are in motion and are destined for the gas filling station. In some embodiments, the government safety supervision service platform 110 may obtain the count of reference vehicles at the second preset frequency. The second preset frequency may be determined based on manual operation or empirical preset.

In 270, in response to determining that a count of reference vehicles is greater than a reference threshold, a regulation instruction may be generated and sent to the reference vehicles through the government safety supervision service platform.

In some embodiments, the reference threshold may be preset. In some embodiments, the reference threshold may be determined based on an actual traffic volume within a preset range of the gas filling station. For example, the actual traffic volume may be negatively correlated with the reference threshold. The preset range refers to a spatial range centered on the gas filling station. A specific size of the present range may be determined based on manual operation or preset.

The regulation instruction is an instruction for regulating the reference vehicles to other gas filling stations. In some embodiments, the regulation instruction may include determining one or more candidate gas filling stations. The one or more candidate gas filling stations are other gas filling stations within the preset range of the gas filling station.

The larger the actual traffic volume, the more likely it is to cause traffic congestion. By setting the reference threshold to a smaller value, more reference vehicles can be deployed to other gas filling stations, which can alleviate the traffic congestion, save time for gas filling users, and improve the user experience.

In some embodiments, the government safety supervision management platform 120 may predict a probability sequence and a time consumption sequence based on positions of the other gas filling stations, current positions of the reference vehicles, residual gas quantities of the reference vehicles, and types of the reference vehicles within the preset range of the gas filling station, and select at least one of the other gas filling stations that satisfies a preset condition as the candidate gas filling station.

The positions of the other gas filling stations are spatial location of the other gas filling stations. The current positions of the reference vehicles are current spatial locations the reference vehicles. The residual gas quantities of the reference vehicles are current residual gas quantities of the reference vehicles. The types of reference vehicles are vehicle types of the reference vehicles (e.g., a car, a truck, etc.).

The probability sequence may consist of a plurality of success probabilities. The success probabilities are probabilities that the reference vehicles successfully travel to one of the other gas filling stations. The reference vehicles successfully traveling to each of the other gas filling stations may correspond to one of the success probabilities. The plurality of success probabilities may constitute the probability sequence.

For example, the government safety monitoring management platform 120 may obtain, at the current moment, an estimated count of miles traveled by the reference vehicles from the current positions of the reference vehicles to a position of a certain gas filling station (hereinafter referred to as an optional gas filling station) of the other gas filling stations, and an estimated travel time. In some embodiments, the government safety supervision management platform 120 may communicate with an electronic map software to obtain the estimated count of miles traveled and the estimated travel time from the electronic map software.

The government safety supervision management platform 120 may further determine, based on the types of the reference vehicles, a gas consumption per unit mile through a first preset correspondence, and determine, based on the estimated count of miles and the gas consumption per unit mile, a reference gas consumption for arriving at the optional gas filling station. For example, the reference gas consumption=the estimated count of miles×the gas consumption per unit mile. The government safety supervision management platform 120 may determine a success probability of the optional gas filling station based on the residual gas quantities of the reference vehicles and a second preset correspondence between the reference gas consumption and the success probability. The probability sequence may be obtained based on the success probability of each of the other gas filling stations.

The time consumption sequence may consist of a plurality of total time consumptions. Each of the total time consumptions is a sum of time consumptions during which the reference vehicles travel to the optional gas filling station and complete gas filling at the optional gas filling station. The reference vehicles traveling to each of the other gas filling stations may correspond to a total time consumption, and plurality of total time consumptions may constitute the time consumption sequence.

In some embodiments, the government safety supervision management platform 120 may determine gas quantities under filling based on full gas quantities (i.e., a gas quantity stored when fully filled, which can be obtained from vehicle factory data) corresponding to the types of the reference vehicles. For example, the gas quantities under filling=the full gas quantities−the residual gas quantities of the reference vehicles. The time consumption of gas filling may be related to the gas quantity under filling and a preset reference gas filling speed, e.g., the time consumption of gas filling=gas quantity under filling÷the preset reference gas filling speed. A sum of the estimated travel time and the time consumption of gas filling of the reference vehicles traveling to the optional gas filling station may be the total time consumption. All the total time consumptions of the reference vehicles traveling to all the optional gas filling stations may constitute the time consumption sequence.

In some embodiments, the preset condition may include that the success probability is higher than a success threshold, and the time consumption of gas filling is lower than a time threshold. That is, the government safety supervision management platform 120 may select at least one of the other gas filling stations of which the success probability is higher than the success threshold and the time consumption of gas filling is lower than the time threshold as a candidate gas filling station. The success threshold and the time threshold may be determined based on empirical preset.

According to the embodiments of the present disclosure, by deploying the reference vehicles to other gas filling stations, the traffic congestion can be alleviated, and time of the gas filling users can be saved, and the user experience can be improved. By determining the operation and maintenance parameters of different gas filling devices of the gas filling station during daily maintenance, the efficiency of device operation and maintenance can be improved, and the risk of failure can be reduced.

In some embodiments, the government safety supervision management platform 120 may divide the future time period into a plurality of future sub-time periods, and predict, through a prediction model, the predicted usage feature of the gas filling station in each of the plurality of future sub-time periods.

The future sub-time periods may be obtained based on manual division or other manners.

FIG. 3 is a schematic diagram illustrating an exemplary prediction model according to some embodiments of the present disclosure.

The prediction model is a model configured to determine a predicted usage feature. The prediction model may be a machine learning model, such as a graph neural networks (GNN) model.

In some embodiments, as shown in FIG. 3, an input of the prediction model 330 may include a gas filling map 310 and a plurality of future sub-time periods 320, and an output of the prediction model 330 may include a predicted usage feature 340. Each predicted usage feature output by the prediction model 330 may correspond to each of the future sub-time periods.

The gas filling map 310 is a map that characterizes a correlation between gas filling stations. The gas filling map may include nodes and edges, the nodes denoting the gas filling stations, and the edges being used to connect the gas filling stations. For example, if a vehicle is capable of passing between two gas filling stations, it is considered that the two gas filling stations are connected. More descriptions regarding the predicted usage feature may be found elsewhere in the present disclosure (e.g., FIG. 2 and the related descriptions thereof).

In some embodiments, the nodes of the gas filling map 310 may correspond to each gas filling station. One of the nodes may correspond to one of the gas filling stations. As shown in FIG. 3, a gas filling station A, a gas filling station A1, a gas filling station A2, a gas filling station A3, and a gas filling station A4 are nodes. Node features of the gas filling map may include historical gas filling data of the gas filling station, a position of the gas filling station, a composition of gas supplied by the gas filling station, a scale of the gas filling station, and weather data in the future time period. More descriptions regarding the historical gas filling data, and the position of the gas filling station may be found elsewhere in the present disclosure (e.g., FIG. 2 and the related descriptions thereof).

The composition of gas supplied by the gas filling station refers to constituents of the gas, which can be obtained through the gas equipment object platform 160. Different compositions of gas may affect the usage effect of gas, which in turn affects the usage speed of gas. The scale of the gas filling station refers to a size of the gas filling station, which can be determined based on a floor area and a count of staff. The larger the floor area and the larger the count of staff, the larger the scale of the gas filling station. The position of the gas filling station and the scale of the gas filling station may affect a count of gas filling users entering the gas filling station per unit time, which in turn affects a count of vehicles in the future time period. The weather data in the future time period is a future weather condition, which can be determined based on, for example, weather forecast and input into the government safety supervision management platform 120. The weather data may affect traveling in the future time period, which in turn affects a gas supply pressure of the gas filling station in the future time period.

In some embodiments, the edges of the gas filling map may correspond to a connectivity relationship between the gas filling stations. For example, if a connection exists between two gas filling stations, the two gas filling stations may be connected. If no connection exists between the two gas filling stations, the two gas filling stations may not be connected (e.g., a path between the two gas filling stations is not accessible). More descriptions regarding the connection may be found in the present disclosure above. Edge features of the edges may include a straight line distance and a travel path between two gas filling stations connected by each of the edges.

In some embodiments, the prediction model may be trained in a manner described below.

Firstly, a first training dataset may be obtained, the first training dataset including a plurality of first training samples and a first label corresponding to each of the first training sample; then a plurality of iterations may be performed, and when an iteration termination condition is satisfied, the iteration may be ended to obtain a trained prediction model. At least one of the iterations may include:

1) selecting one or more first training samples from the first training dataset, and inputting the one or more first training samples into the prediction model to prediction model outputs corresponding to the one or more first training samples;
2) calculating a value of a loss function by substituting the prediction model outputs corresponding to the one or more first training samples and the labels corresponding to the one or more first training samples into a predefined formula of the loss function;
3) reversely updating model parameters of the prediction model based on the value of the loss function in various feasible manners, such as updating based on gradient descent.

In some embodiments, the first training samples may be obtained based on historical data. The first labels corresponding to the first training samples may be obtained by manual labeling. In some embodiments, the first training samples may include a historical gas filling map constructed based on historical data of a first time period, and the first labels may include actual usage features corresponding to the first training samples based on historical data of a second time period. For example, the first labels may include [A1, A2, . . . , Am, A1, A2, . . . , Am], which correspond to actual usage features corresponding to the first training samples in m future sub-time periods, respectively. The first time period may be earlier than the second time period.

According to the embodiments of the present disclosure, the predicted usage feature is determined through the prediction model, and the weather, the features of each gas filling station, and the connection between the gas filling stations are comprehensively considered, such that the accuracy of determining the predicted usage feature is improved, which helps to determine more realistic operation and maintenance parameter.

In some embodiments, the predicted usage feature may further include a predicted traffic feature.

The predicted traffic feature is a predicted traffic flow in the future time period. In some embodiments, the predicted traffic feature may include a count of vehicles of different vehicle types at the gas filling station in each of the plurality of future sub-time periods. Different types of vehicles have different gas storage capacities. The corresponding count of vehicles may affect the gas supply pressure of the gas filling station.

According to the embodiments of the present disclosure, by considering the effect of the count of different types of vehicles on the gas supply pressure of the gas filling station, the accuracy of determining the predicted usage feature can be improved.

In some embodiments, for each of the plurality of gas filling devices, the government safety supervision management platform 120 may determine a fault probability of the gas filling device in the future time period based on a historical operation feature; and determine the operation and maintenance parameter based on the fault probability and the predicted usage feature.

The fault probability is a probability of failure of the gas filling device. In some embodiments, the government safety supervision management platform 120 may determine the fault probability based on the historical operation feature in various ways. For example, the government safety supervision management platform 120 may determine the fault probability based on a first preset table. The first preset table is a table for characterizing a correspondence between the historical operation feature and the fault probability, which may be determined based on empirical preset. More descriptions regarding determining the fault probability may be found elsewhere in the present disclosure (e.g., FIG. 4 and related descriptions thereof).

In some embodiments, the government safety supervision management platform 120 may determine the operation and maintenance parameters based on the fault probability and the predicted usage feature in various ways. For example, the government safety supervision management platform 120 may determine the operation and maintenance parameters based on a second preset table. The second preset table is a table for characterizing a correspondence between the fault probability and the predicted usage feature and the operation and maintenance parameter, and may be determined based on empirical preset. More descriptions regarding the operation and maintenance parameter may be found in the present disclosure below.

FIG. 4 is a schematic diagram illustrating an exemplary fault model according to some embodiments of the present disclosure.

In some embodiments, a fault probability may be determined through a fault model.

The fault model is a model configured to determine the fault probability. The fault model may be a machine learning model, such as any one of deep neural networks (DNN), a support vector machine (SVM), or the like, or any combination thereof.

In some embodiments, as shown in FIG. 4, an input of the fault model 470 may include a historical operation feature 410 and a composition of gas 420, and an output of the fault model 470 may include a fault probability 480. The historical operation feature 410 refers to a historical operation feature of each of gas filling devices. More descriptions regarding the historical operation feature may be found in the related descriptions of FIG. 2. The composition of gas 420 refers to a composition of gas supplied by a smart gas filling station. More descriptions regarding the composition of gas may be found in the related descriptions of FIG. 2. The fault probability 480 refers to a fault probability of each of the gas filling devices in a future time period. More descriptions regarding the fault probability may be found in the present disclosure above. The fault probability of each of the gas filling devices output by the fault model may correspond to the historical operation feature of each of the gas filling devices input to the fault model.

In some embodiments, the fault model may be obtained by joint training with a prediction model.

The government safety supervision management platform 120 may obtain a second training dataset. The second training dataset may include a plurality of first training samples and a first label corresponding to each of the first training samples, and a plurality of second training samples and a second label corresponding to each of the second training samples. The government safety supervision management platform 120 may perform a plurality of iterations. When an iteration termination condition is satisfied, the iteration may be ended, and a trained fault model may be obtained. At least one of the iterations may include: selecting one or more first training samples from the second training dataset, and inputting the one or more first training samples into the prediction model to obtain prediction model outputs corresponding to the one or more first training samples; inputting the prediction model outputs corresponding to the one or more first training samples and one or more second training samples into the fault model to obtain corresponding fault model outputs; calculating a value of the loss function by substituting the prediction model outputs and the first labels corresponding to the one or more first training samples, the fault model outputs and the second labels corresponding to the one or more second training samples into a predefined loss function for joint training; and reversely and simultaneously updating model parameters of the prediction model and the fault model based on the value of the loss function in various feasible manners, such as updating based on gradient descent, etc.

The loss function for joint training may include: weighting and summing a plurality of first sub-loss terms based on a first weight set to obtain a first loss term; weighting and summing a plurality of second sub-loss terms based on a second weight set to obtain a second loss term; multiplying or summing the first loss term and the second loss term to obtain the value of the loss function for joint training.

For example, the loss function for joint training=(a1×first sub-loss term 1+ . . . +am×first sub-loss term m)×(b1×second sub-loss term 1+ . . . +bn×second sub-loss term n), where m denotes a count of future sub-time periods corresponding to the prediction model; and n denotes a count of the gas filling devices. For example, the loss function for joint training=(a1×first sub-loss term 1+ . . . +am×first sub-loss term m)+ (b1×second sub-loss term 1+ . . . +bn×second sub-loss term n), where m denotes a count of the future sub-time periods corresponding to the prediction model; and n denotes a count of the gas filling devices.

If the predicted usage feature of each of the gas filling station of each of the future sub-time periods output by the prediction model is [A10, A20, . . . , Am0], and the corresponding first label is [A1, A2, . . . , Am], each element in [(A1-A10), (A2-A20), . . . , (Am-Am0)] may be the first sub-loss term corresponding to each of the future sub-time periods.

If the fault probability of each of the gas filling devices output by the fault model is [B10, B20, . . . , Bn0], and the corresponding second label is [B1, B2, . . . , Bn], each element in [(B1-B10), (B2-B20), . . . , (Bn-Bn0)] may be the second sub-loss term corresponding to each of the gas filling devices.

A weight corresponding to the first sub-loss term may be determined based on a time distance between the corresponding future sub-time period and a current moment. For example, the weight corresponding to the first sub-loss term may be negatively correlated with the time distance. A weight corresponding to the second sub-loss term may be determined based on an importance of the corresponding gas filling device. For example, the weight corresponding to the second sub-loss term may be positively correlated with the importance. The importance of the gas filling device refers to a usage frequency of the gas filling device during a preset time period.

If the future sub-time period is from T1 to T2 and the current moment is TO, the time distance between the future sub-time period and the current moment may be denoted as T1-T0 or T2-T0.

In some embodiments, the second training samples may be obtained based on historical data. The second labels corresponding to the second training samples may be obtained by manual labeling. In some embodiments, the second training samples may include a historical operation feature and a historical composition of gas of a first time period, and the second labels may include an actual fault probability of each of the gas filling devices corresponding to the second training sample in the historical data of a second time period. For example, the second label is [B1, B2, . . . , Bn], where B1, B2, . . . , Bn denote actual fault situations (denoted as 1 if the gas filling device fails, or denoted as 0) of n future sub-time periods corresponding to the second training samples. The first time period may be earlier than the second time period.

According to the embodiments of the present disclosure, the fault probability is determined through the fault model, so as to improve the reliability and accuracy of determining the fault probability based on massive data.

In some embodiments, as shown in FIG. 4, the input of the fault model may further include at least one of a predicted gas supply feature 430 and a predicted traffic feature 440. The predicted gas supply feature 430 refers to a predicted gas supply feature of the gas filling station in the future time period. More descriptions regarding the predicted gas supply feature may be found in the related descriptions of FIG. 2. The predicted traffic feature 440 refers to the predicted traffic feature 440 in the future time period. More descriptions regarding the predicted traffic feature may be found in the related descriptions of FIG. 2.

The predicted gas supply feature may reflect an estimated traffic flow of different vehicle types in each of the future sub-time periods. For example, buses tend to have more gas filling than ordinary cars, causing the gas filling devices to continue to operate for a longer time period, which in turn increases the fault probability. As another example, if the types of vehicles for gas filling constantly change, operation durations of the gas filling devices also change, which increase the fault probability.

In some embodiments, the second training samples may further include at least one of an actual gas supply feature in the second time period and an actual traffic feature in the second time period.

In some embodiments, as shown in FIG. 4, the input of the fault model may further include a spatial layout 450 of the gas filling station and a position layout 460 of the gas filling devices. The spatial layout of the gas filling station is a spatial structure of the gas filling station, which may be determined based on the design drawings of the gas filling station.

The position layout of the gas filling devices refers to the position of each of the gas filling devices in the gas filling station. A space rectangular coordinate system may be established using any point in the gas filling station as an origin (e.g., an entrance of the gas filling station), and the positions of the gas filling devices may be represented by coordinates, so as to obtain the position layout of the gas filling devices. If the spatial layout of the gas filling station is too compact, or the position layout of the gas filling devices has an unreasonable design, vehicle access and the efficiency of gas supply may be affected, which in turn affects the fault probability.

In some embodiments, the second training samples may further include a spatial layout of a historical gas filling station and a position layout of historical gas filling devices.

According to the embodiments of the present disclosure, the predicted usage feature, the predicted traffic feature, the spatial layout of the gas filling station, and the position layout of the gas filling devices are used as the input of the fault model, such that the usage of the gas filling devices is fully considered, so as to make the output of the fault model more in line with the actual situation, and improve the rationality and accuracy of determining the fault probability. By joint training of the prediction model and the fault model, the accuracy of model training is improved, and the accuracy of the obtained model is improved.

In some embodiments, in response to determining that the fault probability of each of the gas filling devices does not exceed a maintenance threshold, the government safety supervision management platform 120 may determine the operation and maintenance parameter based on the fault probability of each of the gas filling devices in the future time period and the predicted usage feature.

In some embodiments, in response to determining that the fault probability of one of the gas filling devices exceeds the maintenance threshold, the government safety supervision management platform 120 may generate an emergency instruction, the emergency instruction being used to remind the maintenance personnel to immediately perform maintenance on the gas filling device.

The maintenance threshold is a value used to determine whether the gas filling device needs maintenance. The maintenance threshold may be preset based on manual experience. In some embodiments, the government safety supervision management platform 120 may dynamically determine the maintenance threshold. For example, during peak hours or inclement weather conditions, the government safety supervision management platform 120 may automatically reduce the maintenance threshold so as to improve the reliability of the gas filling devices. More descriptions regarding the maintenance threshold may be found in the present disclosure below.

In some embodiments, the maintenance threshold may be determined based on at least one of the predicted gas supply feature and the predicted traffic feature. More descriptions regarding the predicted gas supply feature and the predicted traffic feature may be found in the present disclosure above.

In some embodiments, the maintenance threshold may be negatively correlated with the predicted gas supply feature. For example, when the predicted usage feature is large, it indicates a large gas supply in the future time period. The government safety supervision management platform 120 may reduce the maintenance threshold to reduce the operation risk of the gas filling devices, so as to avoid service interruption.

In some embodiments, the maintenance threshold may be negatively correlated with the predicted traffic feature. For example, when the predicted traffic feature is large, it indicates a high traffic flow in the future time period. The government safety supervision management platform 120 may reduce the maintenance threshold to reduce the operation risk of the gas filling device, so as to avoid service interruption. The maintenance threshold is dynamically adjusted based on the predicted usage feature and the predicted traffic feature, such that maintenance strategies can be flexibly adjusted based on the real-time conditions of the gas filling stations, thereby avoiding service interruption caused by the failure of the gas filling devices, and enhancing the user experience of gas users.

In some embodiments, the government safety supervision management platform 120 may obtain a plurality of clustering families by clustering vectors to be clustered in a clustering database using the fault probability in the future time period as a clustering index, a clustering family where the fault probability of each of the plurality of gas filling devices in the future time period resides being a target clustering family. For each of the gas filling devices, the government safety supervision management platform 120 may determine the operation and maintenance parameter of the gas filling device based on historical predicted usage features and historical operation and maintenance parameters corresponding to a plurality of first type clustering vectors in the target clustering family where the gas filling device resides.

The clustering database is a database for storing historical data. In some embodiments, the clustering database may store historical maintenance data, such as a historical operation and maintenance frequency, a historical operation and maintenance time period, and a historical operation and maintenance item. In some embodiments, the historical data stored in the clustering database may be used for cluster analysis. In some embodiments, the clustering database may store related data involved in a clustering process, such as the plurality of vectors to be clustered, a plurality of clustering families, and the target clustering family.

In some embodiments, the government safety supervision management platform 120 may construct the clustering database. For example, the government safety supervision management platform 120 may store a historical gas filling device type, a historical fault probability of the gas filling device in a future time period, a historical predicted usage feature, a historical operation and maintenance parameter, or the like, into the clustering database.

In some embodiments, the clustering database may include the vectors to be clustered.

The vectors to be clustered are vectors used for cluster analysis in the clustering database. In some embodiments, the vectors to be clustered may include one or more first type clustering vectors, one or more second type clustering vectors, etc.

In some embodiments, the government safety supervision management platform 120 may construct the one or more first type clustering vectors based on the historical gas filling device type, an actual fault probability corresponding to the historical gas filling device in the future time period, the historical predicted usage feature, and the historical operation and maintenance parameter. More descriptions regarding the type of the gas filling device, the fault probability, the predicted usage feature, and the operation and maintenance parameter may be found in the present disclosure above.

In some embodiments, the government safety supervision management platform 120 may construct the one or more second type clustering vectors based on the type of the gas filling device, the fault probability of the gas filling device in the future time period, and the predicted usage feature. More descriptions regarding the type of gas filling device, the fault probability, and the predicted usage feature may be found in the present disclosure above.

The clustering family is a result of grouping the vectors to be clustered through a clustering algorithm. Each of the clustering families contains a set of similar clustering vectors to be clustered (e.g., the first type clustering vectors and the second type clustering vectors, etc.). The target clustering family is a clustering family that contains the second type clustering vectors. In some embodiments, the clustering family where the fault probability of each of the plurality of gas filling devices in the future time period resides may be the target clustering family.

In some embodiments, the government safety supervision management platform 120 may perform cluster analysis on the first type clustering vectors and the second type clustering vectors through the clustering algorithm (e.g., a K-means clustering algorithm, etc.). For example, the government safety supervision management platform may cluster the first type clustering vectors and the second type clustering vectors through the K-means clustering algorithm using the fault probability of the gas filling device in the current future time period as a constraint to obtain a plurality of target clustering families.

In some embodiments, the operation and maintenance parameter may include the operation and maintenance time period, the operation and maintenance item, and the operation and maintenance frequency. In some embodiments, the government safety supervision management platform 120 may use a historical operation and maintenance time period that occurs the most times of the historical operation and maintenance parameters of the plurality of first type clustering vectors in the target clustering family as a current operation and maintenance time period. In some embodiments, the government safety supervision management platform 120 may use a union of historical operation and maintenance items in the historical operation and maintenance parameter as a current operation and maintenance item. In some embodiments, the government safety supervision management platform 120 may perform weighted summation on historical operation and maintenance frequencies in the historical operation and maintenance parameter of the first type clustering vectors, and use a result of weighted summation as a current operation and maintenance frequency.

In some embodiments, a weight of weighted summation may be determined based on historical predicted usage features corresponding to the first type clustering vectors. For example, the weight may be positively correlated with the historical predicted usage features corresponding to the first type clustering vectors. The larger the historical predicted usage feature, i.e., the larger the predicted gas supply feature and the larger the predicted traffic feature, the larger the gas supply in the future time period, the more the traffic flow, and the more the use of the gas filling devices. In this case, more maintenance is performed, i.e., the operation and maintenance frequency is increased.

The vectors to be clustered in the clustering database are clustered based on the historical data using the fault probability in the future time period as the clustering index, such that the accuracy and validity of determining the operation and maintenance parameter can be improved.

One or more embodiments of the present disclosure further provide a non-transitory computer-readable storage medium comprising computer instructions that, when read by a computer, may direct the computer to perform any method as descried in the embodiments above.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for maintaining a smart gas filling station based on safety supervision, implemented by an Internet of Things (IoT) system for maintaining a smart gas filling station, wherein the IoT system includes a government safety supervision service platform, a government safety supervision management platform, a government safety supervision sensor network platform, a government safety supervision object platform, a gas company sensor network platform, and a gas equipment object platform, and the government safety supervision object platform includes a gas company management platform; the method comprises:

in response to determining that a current moment is a preset moment for updating a maintenance parameter and a residual computational resource of the IoT system is greater than a computational threshold at the current moment by the government safety supervision management platform:

obtaining, through the gas equipment object platform, historical gas filling data of the gas filling station in a preset time period, the historical gas filling data refers to gas filling data in the preset time period, the gas filling data including a target vehicle, a gas filling time of the target vehicle, and a gas filling volume, and the target vehicles being a vehicle that performs gas filing at the gas filling station;

determining, based on the historical gas filling data, a predicted usage feature of the gas filling station in a future time period, including:

dividing the future time period into a plurality of future sub-time periods, and predicting, through a prediction model, the predicted usage feature of the gas filling station in each of the plurality of future sub-time periods, the prediction model being a machine learning model, an input of the prediction model including a gas filling map and the plurality of future sub-time periods, the gas filling map including nodes and edges, the nodes denoting the gas filling stations, the edges being used to connect the gas filling stations, and training of the prediction model includes:

obtaining a first training dataset, the first training dataset including a plurality of first training samples and a first label corresponding to each of the first training samples; and performing a plurality of iterations, and when an iteration termination condition is satisfied, ending the iteration to obtain a trained prediction model, wherein at least one of the iterations including:

selecting one or more first training samples from the first training dataset;

inputting the one or more first training samples into the prediction model to obtain prediction model outputs corresponding to the one or more first training samples; and calculating a value of a loss function by substituting the prediction model outputs corresponding to the one or more first training sample and the first labels corresponding to the one or more first training samples into a predefined formula of the loss function, and reversely updating model parameters of the prediction model based on the value of the loss function;

obtaining, through the gas equipment object platform, historical operation data of a plurality of gas filling devices of the gas filling station in the preset time period; the historical operation data of the plurality of gas filling devices being collected at first preset frequencies, and the first preset frequencies of different gas filling devices being different;

determining a historical operation feature of each of the plurality of gas filling devices based on the historical operation data of the plurality of gas filling devices; the plurality of gas filling devices including a gas storage device, a gas dispenser, a submerged liquefied natural gas (LNG) pump, a gas filling column, a gas relief column, and a discharge pipe; the historical operation data including usage frequencies of the gas filling device and an operation parameter sequence, and the historical operation data being obtained through a temperature sensor, a pressure sensor, a speed sensor, and a vibration sensor disposed on a corresponding gas filling device;

determining an operation and maintenance parameter of each of the plurality of gas filling devices based on the predicted usage feature of the gas filling station and the historical operation feature of each of the plurality of gas filling devices, including:

for each of the plurality of gas filling devices, determining, by a fault model, a fault probability of the gas filling device in the future time period based on the historical operation feature, wherein the fault model is a machine learning model, an input of the fault model includes the historical operation feature and a composition of gas, and the fault model is obtained through joint training with the prediction model, including:

obtaining a second training dataset, the second training dataset including a plurality of the first training samples and a first label corresponding to each of the first training samples, and a plurality of second training samples and a second label corresponding to each of the second training samples; and performing a plurality of iterations, and when an iteration termination condition is satisfied, ending the iteration to obtain a trained fault model, wherein at least one of the iterations includes:

selecting one or more first training samples from the second training dataset, and inputting the one or more first training samples into the prediction model to obtain prediction model outputs corresponding to the one or more first training samples;

inputting the prediction model outputs corresponding to the one or more first training samples and one or more second training samples into the fault model to obtain corresponding fault model outputs;

calculating a value of a loss function by substituting the prediction model outputs, the first labels corresponding to the one or more first training samples, the fault model outputs, and the second labels corresponding to the one or more second training samples into a predefined joint loss function for joint training; and reversely and simultaneously updating model parameters of the prediction model and the fault model based on the value of the loss function, wherein a determination of the joint loss function for joint training includes:

weighting and summing a plurality of first sub-loss terms based on a first weight set to obtain a first loss term;

weighting and summing a plurality of second sub-loss terms based on a second weight set to obtain a second loss term; and multiplying or summing the first loss term and the second loss term to obtain the value of the loss function for joint training, wherein a weight corresponding to the first sub-loss term is negatively correlated with the time distance, and a weight corresponding to the second sub-loss term is positively correlated with a usage frequency of the gas filling device in the preset time period; and determining the operation and the maintenance parameter according to the fault probability and the predicted usage characteristics; and generating a maintenance instruction to be sent to the gas company management platform;

determining a maintenance time period in the maintenance instruction based on an operation and maintenance frequency and an operation and maintenance time period in the maintenance instruction, mobilizing maintenance personnel to the gas filling station in the maintenance time period to perform maintenance according to an operation and maintenance item in the maintenance instruction; the operation and maintenance parameter including an operation and maintenance frequency, an operation and maintenance time period, and an operation and maintenance item;

for each of the plurality of gas filling devices, determining a time distance based on the operation and maintenance frequency of the gas filling device, the time difference being a time difference between the current moment and a next maintenance time period of the gas filling device, and adjusting the first preset frequency corresponding to the gas filling device based on the time distance, wherein the first preset frequency is negatively correlated with the time distance;

obtaining, through the government safety supervision service platform, a count of reference vehicles at a second preset frequency; the reference vehicles being vehicles that are in motion and are destined for the gas filling station; and generating a regulation instruction in response to determining that the count of the reference vehicles is greater than a reference threshold, and sending the regulation instruction to the reference vehicles through the government safety supervision service platform; the regulation instruction including determining one or more candidate gas filling stations, and the one or more candidate gas filling stations being other gas filling stations within a preset range of the gas filling station.

2. The method of claim 1, wherein the reference threshold is determined based on an actual traffic volume within the preset range.

3. The method of claim 1, wherein the determining one or more candidate gas filling stations includes:

predicting a probability sequence and a time consumption sequence based on positions of the other gas filling stations, current positions of the reference vehicles, residual gas quantities of the reference vehicles, and types of the reference vehicles within the preset range of the gas filling station; the probability sequence consisting of a plurality of success probabilities, and the time consumption sequence consisting of a plurality of total time consumptions; and selecting at least one of the other gas filling stations that satisfies a preset condition as the candidate gas filling station.

4. The method of claim 1, wherein node features of the nodes include the historical gas filling data of the gas filling station, a position of the gas filling station, a composition of gas supplied by the gas filling station, a scale of the gas filling station, and weather data in the future time period; edge features of the edges include a straight line distance and a travel path between two gas filling stations connected by each of the edges.

5. The method of claim 1, wherein the predicted usage feature includes a predicted traffic feature, and the predicted traffic feature includes a count of vehicles of different vehicle types at the gas filling station in each of the plurality of future sub-time periods.

6. The method of claim 1, wherein the input of the fault model further includes at least one of a predicted gas supply feature and a predicted traffic feature.

7. The method of claim 1, wherein the input of the fault model further includes a spatial layout of the gas filling station and a position layout of the plurality of gas filling devices.

8. The method of claim 1, further comprising: in response to determining that the fault probability of the gas filling device does not exceed a maintenance threshold, determining, based on the fault probability of each of the gas filling devices in the future time period and the predicted usage feature, the operation and maintenance parameter.

9. The method of claim 8, further comprising:

obtaining a plurality of clustering families by clustering vectors to be clustered in a clustering database using the fault probability in the future time period as a clustering index, a clustering family where the fault probability of each of the plurality of gas filling devices in the future time period resides being a target clustering family; and for each of the gas filling devices, determining the operation and maintenance parameter of the gas filling device based on historical predicted usage features and historical operation and maintenance parameters corresponding to a plurality of first type clustering vectors in the target clustering family where the gas filling device resides.

10. The method of claim 9, wherein the operation and maintenance parameter includes an operation and maintenance time period, an operation and maintenance item, and an operation and maintenance frequency;

the determining the operation and maintenance parameter of the gas filling device includes:

using a historical operation and maintenance time period that occurs the most times among historical operation and maintenance parameters of a plurality of first type clustering vectors in the target clustering family as a current operation and maintenance time period;

using a union of historical operation and maintenance items in the historical operation and maintenance parameters as a current operation and maintenance item; and performing weighted summation on historical operation and maintenance frequencies in the historical operation and maintenance parameters of the first type clustering vectors, and using a result of the weighted summation as a current operation and maintenance frequency.

11. The method of claim 10, wherein a weight of the weighted summation is positively correlated with historical predicted usage features corresponding to the first type clustering vectors.

12. The method of claim 8, wherein the maintenance threshold is determined based on at least one of a predicted gas supply feature and a predicted traffic feature.

13. An Internet of Things (IoT) system for maintaining a smart gas filling station based on safety supervision, comprising a government safety supervision service platform, a government safety supervision management platform, a government safety supervision sensor network platform, a government safety supervision object platform, a gas company sensor network platform, and a gas equipment object platform, and the government safety supervision object platform includes a gas company management platform; wherein the IoT system is configured to:

in response to determining that a current moment is a preset moment for updating a maintenance parameter and a residual computational resource of the IoT system is greater than a computational threshold at the current moment by the government safety supervision management platform:

obtain, through the gas equipment object platform, historical gas filling data of the gas filling station in a preset time period; the historical gas filling data refers to gas filling data in the preset time period, the gas filling data including a target vehicle, a gas filling time of the target vehicle, and a gas filling volume, and the target vehicles being a vehicle that performs gas filling at the gas filling station;

determine, based on the historical gas filling data, a predicted usage feature of the gas filling station in a future time period, including:

dividing the future time period into a plurality of future sub-time periods, and predicting, through a prediction model, the predicted usage feature of the gas filling station in each of the plurality of future sub-time periods; the prediction model being a machine learning model, an input of the prediction model includes a gas filling map and the plurality of future sub-time periods, the gas filling map including nodes and edges, the nodes denoting the gas filling stations, the edges being used to connect the gas filling stations, and training of the prediction model including:

obtaining a first training dataset, the first training dataset including a plurality of first training samples and a first label corresponding to each of the first training samples; and performing a plurality of iterations, and when an iteration termination condition is satisfied, ending the iteration to obtain a trained prediction model, wherein at least one of the iterations includes:

selecting one or more first training samples from the first training dataset;

inputting the one or more first training samples into the prediction model to obtain prediction model outputs corresponding to the one or more first training samples;

calculating a value of a loss function by substituting the prediction model outputs corresponding to the one or more first training samples and the labels corresponding to the one or more first training samples into a predefined formula of the loss function; and reversely updating model parameters of the prediction model based on the value of the loss function;

obtain, through the gas equipment object platform, historical operation data of a plurality of gas filling devices of the gas filling station in the preset time period; the historical operation data of the plurality of gas filling devices being collected at first preset frequencies, and the first preset frequencies of different gas filling devices being different;

determine a historical operation feature of each of the plurality of gas filling devices based on the historical operation data of the plurality of gas filling devices; the plurality of gas filling devices including a gas storage device, a gas dispenser, a submerged liquefied natural gas (LNG) pump, a gas filling column, a gas relief column, and a discharge pipe; the operation data including use frequencies of the gas filling devices and an operation parameter sequence; the operation data being obtained through a temperature sensor, a pressure sensor, a speed sensor, and a vibration sensor disposed on the corresponding gas filling device;

determine an operation and maintenance parameter of each of the plurality of gas filling devices based on the predicted usage feature of the gas filling station and the historical operation feature of each of the plurality of gas filling devices, including:

for each of the plurality of gas filling devices, through a fault model determining a fault probability of the gas filling device in the future time period based on the historical operation feature; the fault model is a machine learning model, and an input of the fault model includes the historical operation feature and a composition of gas; the fault model is obtained through joint training with the prediction model, including:

obtaining a second training dataset, the second training dataset including a plurality of the first training samples and a first label corresponding to each of the first training samples, and a plurality of second training samples and a second label corresponding to each of the second training samples; and performing a plurality of iterations, and when an iteration termination condition is satisfied, ending the iteration to obtain a trained fault model, wherein at least one of the iterations includes:

selecting one or more first training samples from the second training dataset, and inputting the one or more first training samples into the prediction model to obtain prediction model outputs corresponding to the one or more first training samples;

inputting the prediction model outputs corresponding to the one or more first training samples and one or more second training samples into the fault model to obtain corresponding fault model outputs;

calculating a value of a loss function by substituting the prediction model outputs, the first labels corresponding to the one or more first training samples, the fault model outputs, and the second labels corresponding to the one or more second training samples into a predefined joint loss function for joint training; and reversely and simultaneously updating model parameters of the prediction model and the fault model based on the value of the loss function, wherein a determination of the joint loss function for joint training includes:

weighting and summing a plurality of first sub-loss terms based on a first weight set to obtain a first loss term;

weighting and summing a plurality of second sub-loss terms based on a second weight set to obtain a second loss term; and multiplying or summing the first loss term and the second loss term to obtain the value of the loss function for joint training; a weight corresponding to the first sub-loss term is negatively correlated with the time distance, and a weight corresponding to the second sub-loss term is positively correlated with a usage frequency of the gas filling device in the preset time period; and based on the fault probability and the predicted usage feature, determining the operation and the maintenance parameter; and generate a maintenance instruction to be sent to the gas company management platform;

determine a maintenance time period in the maintenance instruction based on an operation and maintenance frequency and an operation and maintenance time period in the maintenance instruction, mobilizing maintenance personnel to the gas filling station in the maintenance time period to perform maintenance according to an operation and maintenance item in the maintenance instruction; the operation and maintenance parameter including an operation and maintenance frequency, an operation and maintenance time period, and an operation and maintenance item;

for each of the plurality of gas filling devices, determine a time distance based on the operation and maintenance frequency of the gas filling device, the time difference being a time difference between the current moment and a next maintenance time period of the gas filling device, and adjust the first preset frequency corresponding to the gas filling device based on the time distance, wherein the first preset frequency is negatively correlated with the time distance;

obtain, through the government safety supervision service platform, a count of reference vehicles at a second preset frequency; the reference vehicles being vehicles that are in motion and are destined for the gas filling station; and generate a regulation instruction in response to determining that the count of the reference vehicles is greater than a reference threshold, and send the regulation instruction to the reference vehicles through the government safety supervision service platform; the regulation instruction including determining one or more candidate gas filling stations, and the one or more candidate gas filling stations being other gas filling stations within a preset range of the gas filling station.

14. The IoT system of claim 13, wherein the IoT system is further configured to: in response to determining that the fault probability of the gas filling device does not exceed a maintenance threshold, determine, based on the fault probability of each of the gas filling devices in the future time period and the predicted usage feature, the operation and maintenance parameter.

15. The IoT system of claim 14, wherein the IoT system is further configured to:

obtain a plurality of clustering families by clustering vectors to be clustered in a clustering database using the fault probability in the future time period as a clustering index, a clustering family where the fault probability of each of the plurality of gas filling devices in the future time period resides being a target clustering family; and for each of the gas filling devices, determine the operation and maintenance parameter of the gas filling device based on historical predicted usage features and historical operation and maintenance parameters corresponding to a plurality of first type clustering vectors in the target clustering family where the gas filling device resides.

* * * * *